(12) United States Patent
Lin

(10) Patent No.: US 12,722,999 B2
(45) Date of Patent: Sep. 1, 2026

(54) GLASS COMPOSITION WITH LOW THERMAL EXPANSION COEFFICIENT AND GLASS FIBER MADE OF THE SAME

(71) Applicant: TAIWAN GLASS INDUSTRY CORP., Taipei City (TW)

(72) Inventor: Chia-Yu Lin, Taipei City (TW)

(73) Assignee: TAIWAN GLASS INDUSTRY CORP., Taipei City (TW)

( * ) Notice: Subject to any disclaimer, the term of this patent is extended or adjusted under 35 U.S.C. 154(b) by 109 days.

(21) Appl. No.: 17/207,608

(22) Filed: Mar. 20, 2021

(65) Prior Publication Data

US 2022/0169561 A1 Jun. 2, 2022

(30) Foreign Application Priority Data

Dec. 2, 2020 (TW) ................................ 109142478

(51) Int. Cl.
*C03C 13/00* (2006.01)
*C03C 3/087* (2006.01)
(Continued)

(52) U.S. Cl.
CPC .............. *C03C 13/00* (2013.01); *C03C 3/087* (2013.01); *C03C 3/091* (2013.01); *C03C 3/093* (2013.01); *C03C 3/118* (2013.01); *C03C 2213/00* (2013.01)

(58) Field of Classification Search
CPC ......... C03C 13/00; C03C 3/087; C03C 3/091; C03C 3/093; C03C 3/118; C03C 2213/00; C03C 13/06
See application file for complete search history.

(56) References Cited

U.S. PATENT DOCUMENTS

2013/0203583 A1* 8/2013 Zhang ..................... C03C 13/06 501/38
2017/0101338 A1* 4/2017 Li ........................... C08K 7/14
(Continued)

FOREIGN PATENT DOCUMENTS

CN 101012105 A 8/2007
CN 101838110 A 9/2010
(Continued)

OTHER PUBLICATIONS

JPH0948632A machine translation (Year: 1997).*
JP-2000247683-A machine translation (Year: 2000).*
CN105693270A machine translation (Year: 2016).*

*Primary Examiner* — Cameron K Miller

(57) ABSTRACT

A glass composition and a glass fiber made thereof have a low thermal expansion coefficient and include a main material, a fluxing material and a reinforcing material. The main material includes silicon dioxide having a percentage by weight of 55%-66% of the glass composition. The reinforcing material includes aluminum oxide having a percentage by weight of 10%-20% of the glass composition. The fluxing material includes magnesium oxide, zinc oxide, and titanium dioxide. The percentage by weight of magnesium oxide is 3%-12% of the glass composition, the percentage by weight of zinc oxide is 0.01%-7% of the glass composition, and the percentage by weight of titanium dioxide is 0.01%-6% of the glass composition. By adding zinc oxide and titanium dioxide, the thermal expansion coefficient of the glass composition can be lowered.

20 Claims, 2 Drawing Sheets

| Ingredient (%) | A5 | A6 | A7 | A8 |
|---|---|---|---|---|
| $SiO_2$ | 62.50 | 62.00 | 60.10 | 61.70 |
| ZnO | 2.94 | 2.93 | 2.66 | 2.66 |
| $TiO_2$ | 1.79 | 1.83 | 2.52 | 2.73 |
| $Fe_2O_3$ | 0.10 | 0.12 | 0.14 | 0.09 |
| $Al_2O_3$ | 15.40 | 15.80 | 16.00 | 16.00 |
| CaO | 0.33 | 0.23 | 0.31 | 0.17 |
| MgO | 6.70 | 7.42 | 7.55 | 7.79 |
| $Na_2O$ | 0.27 | - | 0.33 | - |
| $K_2O$ | - | 0.03 | - | - |
| $B_2O_3$ | 9.44 | 8.80 | 9.02 | 7.89 |
| $Li_2O$ | 0.02 | 0.01 | 0.01 | 0.00 |
| $F_2$ | - | - | - | - |
| Viscosity Temperature (°C) | 1421.2 | 1427.5 | 1405.9 | 1416.0 |
| Density (g/cm$^3$) | 2.402 | 2.399 | 2.421 | 2.418 |
| CTE (ppm/°C) | 2.41 | 2.37 | 2.49 | 2.38 |
| Dk (10M) | 5.0 | 5.1 | 5.6 | 5.2 |
| Dk (100M) | 5.0 | 5.1 | 5.6 | 5.2 |
| Dk (1G) | 5.0 | 5.1 | 5.5 | 5.2 |
| Df (10M) | <0.001 | <0.001 | <0.001 | <0.001 |
| Df (100M) | 0.001 | 0.001 | 0.001 | 0.001 |
| Df (1G) | <0.001 | <0.001 | 0.002 | <0.001 |

| Ingredient (%) | A5 | A6 | A7 | A8 |
|---|---|---|---|---|
| $SiO_2$ | 62.50 | 62.00 | 60.10 | 61.70 |
| ZnO | 2.94 | 2.93 | 2.66 | 2.66 |
| $TiO_2$ | 1.79 | 1.83 | 2.52 | 2.73 |
| $Fe_2O_3$ | 0.10 | 0.12 | 0.14 | 0.09 |
| $Al_2O_3$ | 15.40 | 15.80 | 16.00 | 16.00 |
| CaO | 0.33 | 0.23 | 0.31 | 0.17 |
| MgO | 6.70 | 7.42 | 7.55 | 7.79 |
| $Na_2O$ | 0.27 | - | 0.33 | - |
| $K_2O$ | - | 0.03 | - | - |
| $B_2O_3$ | 9.44 | 8.80 | 9.02 | 7.89 |
| $Li_2O$ | 0.02 | 0.01 | 0.01 | 0.00 |
| $F_2$ | - | - | - | - |
| Viscosity Temperature (°C) | 1421.2 | 1427.5 | 1405.9 | 1416.0 |
| Density (g/cm$^3$) | 2.402 | 2.399 | 2.421 | 2.418 |
| CTE (ppm/°C) | 2.41 | 2.37 | 2.49 | 2.38 |
| Dk (10M) | 5.0 | 5.1 | 5.6 | 5.2 |
| Dk (100M) | 5.0 | 5.1 | 5.6 | 5.2 |
| Dk (1G) | 5.0 | 5.1 | 5.5 | 5.2 |
| Df (10M) | <0.001 | <0.001 | <0.001 | <0.001 |
| Df (100M) | 0.001 | 0.001 | 0.001 | 0.001 |
| Df (1G) | <0.001 | <0.001 | 0.002 | <0.001 |

(51) Int. Cl.

| | |
|---|---|
| ***C03C 3/091*** | (2006.01) |
| ***C03C 3/093*** | (2006.01) |
| ***C03C 3/118*** | (2006.01) |

(56) References Cited

U.S. PATENT DOCUMENTS

| | | | | |
|---|---|---|---|---|
| 2020/0189965 | A1* | 6/2020 | Comte | C03C 4/02 |
| 2020/0369559 | A1* | 11/2020 | Ohkawa | C03C 3/091 |
| 2023/0159379 | A1* | 5/2023 | Yokota | C03C 3/083<br>501/7 |
| 2023/0357070 | A1* | 11/2023 | Matano | C03C 21/002 |

FOREIGN PATENT DOCUMENTS

| | | | | | |
|---|---|---|---|---|---|
| CN | 103332866 | A | | 10/2013 | |
| CN | 103339076 | A | | 10/2013 | |
| CN | 105693270 | A | * | 6/2016 | |
| JP | H08-295530 | A | | 11/1996 | |
| JP | H0948632 | A | * | 2/1997 | |
| JP | 2000247683 | A | * | 9/2000 | C03C 13/00 |
| JP | H12-2000247683 | A | | 9/2000 | |
| JP | H16-2004508265 | A | | 3/2004 | |
| JP | H19-2007256764 | A | | 10/2007 | |

* cited by examiner

| Ingredient (%) | A1 (S-Glass) | A2 (S-Glass) | A3 | A4 |
|---|---|---|---|---|
| $SiO_2$ | 63.9 | 64.4 | 62.70 | 61.90 |
| ZnO | - | - | - | - |
| $TiO_2$ | 0.027 | - | - | 0.02 |
| $Fe_2O_3$ | 0.07 | 0.06 | 0.21 | 0.18 |
| $Al_2O_3$ | 24.4 | 24.9 | 20.90 | 19.00 |
| CaO | 0.13 | 0.389 | 0.40 | 0.24 |
| MgO | 11.4 | 9.85 | 10.10 | 9.56 |
| $Na_2O$ | 0.24 | - | - | - |
| $K_2O$ | 0.01 | - | - | - |
| $B_2O_3$ | - | - | 5.22 | 9.04 |
| $Li_2O$ | - | 0.011 | 0.18 | 0.20 |
| $F_2$ | - | - | 0.01 | - |
| Viscosity Temperature (°C) | 1461.5 | 1476.8 | 1390.8 | 1393.1 |
| Density (g/cm$^3$) | 2.470 | 2.473 | 2.431 | 2.429 |
| CTE (ppm/°C) | 3.19 | 2.99 | 2.98 | 2.96 |
| Dk (10M) | 5.6 | 4.1 | 5.4 | 4.8 |
| Dk (100M) | 5.5 | 4.0 | 5.3 | 4.8 |
| Dk (1G) | 5.5 | 4.0 | 5.2 | 4.7 |
| Df (10M) | 0.002 | 0.002 | <0.001 | <0.001 |
| Df (100M) | 0.002 | 0.002 | 0.003 | 0.002 |
| Df (1G) | 0.002 | 0.001 | 0.003 | 0.003 |

FIG. 1A

| Ingredient (%) | A5 | A6 | A7 | A8 |
|---|---|---|---|---|
| $SiO_2$ | 62.50 | 62.00 | 60.10 | 61.70 |
| ZnO | 2.94 | 2.93 | 2.66 | 2.66 |
| $TiO_2$ | 1.79 | 1.83 | 2.52 | 2.73 |
| $Fe_2O_3$ | 0.10 | 0.12 | 0.14 | 0.09 |
| $Al_2O_3$ | 15.40 | 15.80 | 16.00 | 16.00 |
| CaO | 0.33 | 0.23 | 0.31 | 0.17 |
| MgO | 6.70 | 7.42 | 7.55 | 7.79 |
| $Na_2O$ | 0.27 | - | 0.33 | - |
| $K_2O$ | - | 0.03 | - | - |
| $B_2O_3$ | 9.44 | 8.80 | 9.02 | 7.89 |
| $Li_2O$ | 0.02 | 0.01 | 0.01 | 0.00 |
| $F_2$ | - | - | - | - |
| Viscosity Temperature (°C) | 1421.2 | 1427.5 | 1405.9 | 1416.0 |
| Density (g/cm$^3$) | 2.402 | 2.399 | 2.421 | 2.418 |
| CTE (ppm/°C) | 2.41 | 2.37 | 2.49 | 2.38 |
| Dk (10M) | 5.0 | 5.1 | 5.6 | 5.2 |
| Dk (100M) | 5.0 | 5.1 | 5.6 | 5.2 |
| Dk (1G) | 5.0 | 5.1 | 5.5 | 5.2 |
| Df (10M) | <0.001 | <0.001 | <0.001 | <0.001 |
| Df (100M) | 0.001 | 0.001 | 0.001 | 0.001 |
| Df (1G) | <0.001 | <0.001 | 0.002 | <0.001 |

FIG. 1B

GLASS COMPOSITION WITH LOW THERMAL EXPANSION COEFFICIENT AND GLASS FIBER MADE OF THE SAME

CROSS-REFERENCE TO RELATED PATENT APPLICATION

This non-provisional application claims priority to and the benefit of, under 35 U.S.C. § 119(a), Taiwan Patent Application No. 109142478 filed in Taiwan (R.O.C.) on Dec. 2, 2020. The entire content of the above identified application is incorporated herein by reference.

FIELD

The present disclosure relates to a glass composition, and more particularly to a glass composition added with zinc oxide (ZnO) and titanium dioxide ($TiO_2$) and having a lowered thermal expansion coefficient and a lowered viscosity temperature.

BACKGROUND

With the advancement of wired and wireless network technologies, and with the substantial increase in market demand for multifunctional, high-speed, and high-frequency electronic devices (e.g., smartphones, tablet computers, electronic game consoles, smartwatches, servers, and true wireless stereo (TWS) earphones), electronic devices with different functions have been developed. To increase the operating speed and frequency of an electronic device while complying with electrical specifications, it is generally required that the printed circuit board (PCB) used in the electronic device be made of a low-dielectric constant (low-Dk) and low-dissipation factor (low-Df) material.

Besides, as an integrated circuit (IC) substrate, which serves as the interface between an IC and a PCB, has a clear advantage over the traditional lead frames in terms of transmission speed, performance, and size, many high-speed computing chips such as central processing units (CPUs), graphics processing units (GPUs), the antenna-in-packages (AiPs) of mobile phones, and network communication ICs have started using IC substrates as their basic interface, which explains why the demand for IC substrates and ball grid arrays (BGAs) for use in high-end PCB products is entering a fast growing stage. To meet product requirements, the material of an IC substrate must in most cases have a low thermal expansion coefficient (or coefficient of thermal expansion, CTE) and high fiber strength, as well as electrical properties such as a low dielectric constant and a low dissipation factor.

Glass fiber has become an indispensable material in modern industries duo to its outstanding physical properties. In particular, "glass yarn" made of electrical-grade glass (E-glass) fiber has been one of the essential materials with which to make the aforesaid products. Generally, the process of making glass fiber out of a glass material entails placing the glass material into a furnace, where the glass material is heated to the intended "viscosity temperature" and melted into a mass of homogeneous molten glass. The molten glass is then extruded through a bushing to produce individual glass fibers. The "viscosity temperature" refers to the temperature at which the viscosity of a melted glass material reaches $10^3$ poise. As viscosity is generally expressed as a logarithm, the viscosity temperature of a mass of molten glass in its ideal molten state is also referred to as the Log3 temperature. Continued from the above, while the glass material is transitioning from the molten state to glass, bubbles are generated therein, and the higher the viscosity of the glass material, the more the bubbles that will stay in the glass. The bubbles form hollow fiber structures in the resulting glass fiber, thus compromising the electrical properties of the glass fiber or even rendering unusable the PCBs or IC substrates made of such fiber.

E-glass of the traditional formulae has a thermal expansion coefficient as high as 5.4 ppm/° C. and therefore does not meet the requirements of high-end IC substrates. D-glass has a desirable thermal expansion coefficient up to 3.0 ppm/° C., but also has an extremely high melting temperature and viscosity that cause difficulties in manufacture; consequently. D-glass formulae cannot be used to make glass fiber with a diameter of 7 μm or below, and the application of D-glass to PCBs is limited. Furthermore, the high viscosity of D-glass makes it difficult to eliminate the bubbles therein, so a glass fabric made of D-glass fiber may contain a large amount of hollow fibers, meaning D-glass cannot be used reliably in PCBs.

The current solution in the PCB industry is to use glass fiber formulae with a high silicon dioxide content, added with aluminum oxide ($Al_2O_3$), such as those of T-glass, which can be viewed as a member of the S-glass family and is hereinafter referred to as S-glass, and whose thermal expansion coefficient is lower than that of E-glass and can be as low as 2.8 ppm/° C. While S-glass formulae can be used to produce exceptionally thin fiber, the high viscosity of S-glass hinders the mass production, and substantially increases the cost, of S-glass; as a result, S-glass is not used as extensively as E-glass. In the meantime, the PCB industry is still seeking materials whose thermal expansion coefficients are lower than that of S-glass.

It can be known from the above that the existing glass fibers still have their technical inadequacies. The issue to be addressed by the present disclosure, therefore, is to solve the aforesaid issues effectively and develop glass fiber that has an even lower thermal expansion coefficient and is more suitable for mass production so as to meet the stringent requirements of future high-end electronic products.

SUMMARY

In view of the higher thermal expansion coefficients of the conventional glass compositions used for producing glass fiber, as a result of years of practical experience and repeated research, tests and manufacturing, the present disclosure provides a glass composition and a glass fiber made thereof that have a low thermal expansion coefficient. Compared with the conventional S-Glass and D-Glass glass fiber, the glass composition and glass fiber according to the present disclosure have a better thermal expansion coefficient and a lower viscosity temperature.

One aspect of the present disclosure is directed to a glass composition including a main material, a reinforcing material and a fluxing material. The main material includes silicon dioxide, and the silicon dioxide has a percentage by weight of 55%-66% of the glass composition. The reinforcing material improves the structural strength of the glass composition, and includes aluminum oxide that has a percentage by weight of 10%-20% of the glass composition. The fluxing material lowers a thermal expansion coefficient and a viscosity temperature of the glass composition, and includes magnesium oxide (MgO), zinc oxide, and titanium dioxide. The percentage by weight of magnesium oxide is 3%-12% of the glass composition, the percentage by weight of zinc oxide is 0.01%-7% of the glass composition, and the percentage by weight of titanium dioxide is 0.01%-6% of the glass composition. By adding zinc oxide and titanium dioxide, the thermal expansion coefficient of the glass composition can be lowered.

Another aspect of the present disclosure is directed to a glass fiber made of the glass composition stated above.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIGS. 1A and 1B show the test results of the exemplary glass composition according to the present disclosure and of the comparative examples prepared by conventional techniques.

DETAILED DESCRIPTION

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like.

The present disclosure provides a glass composition having a low thermal expansion coefficient and glass fiber made of the same. In addition to glass fiber, the glass composition according to the present disclosure can also be used to produce other glass products. In certain embodiments, the glass composition includes a main material, a fluxing material, and a reinforcing material. The main material includes silicon dioxide, which is one of the skeleton oxides of which glass is made. A higher silicon dioxide content leads to a lower thermal expansion coefficient but also results in a higher viscosity temperature to be reached when the aforesaid raw materials are melted to make glass. To achieve a low thermal expansion coefficient, the silicon dioxide in certain embodiments according to the present disclosure has a weight by percentage of 55%-66% of the glass composition. While the foregoing percentage may be lower than the silicon dioxide content (65%) of S-glass, the glass composition according to the present disclosure has a more desirable thermal expansion coefficient and a lower viscosity temperature than those of S-glass.

As stated above, the viscosity temperature increases with the silicon dioxide content. The fluxing material is therefore used to lower the viscosity of the glass composition when the glass composition is melted. In certain embodiments, the fluxing material includes magnesium oxide, zinc oxide, and titanium dioxide. Magnesium oxide can lower the melting temperature of the glass composition to facilitate melting and the formation of glass fiber, and can prevent devitrification, lower the thermal expansion coefficient, and increase the modulus of elasticity. Magnesium oxide is also an alkaline earth metal oxide that has relatively larger impact on the ion exchange process in glassmaking. However, too high a magnesium oxide content not only is disadvantageous to lowering the dielectric constant and dissipation factor of the glass composition, but also encourages phase separation in the glass composition. In certain embodiments, therefore, magnesium oxide has a weight by percentage of 3%-12%, preferably 4%-0%, of the glass composition. Furthermore, the addition of a small amount of titanium dioxide can lower the viscosity temperature to be reached when the aforesaid raw materials are melted to make glass, and can also reduce the thermal expansion coefficient, and enhance the mechanical properties, of the glass composition. A relatively high titanium dioxide content, however, will have a negative effect on glass color. In certain embodiments, therefore, titanium dioxide has a weight by percentage of 0.01%-6% of the glass composition. Moreover, adding a small amount of zinc oxide can not only lower the thermal expansion coefficient and the melting temperature of the glass composition, but also increase the chemical durability of the glass composition. Adding too much zinc oxide, however, will lower the modulus of elasticity of the glass composition and thereby compromise the glass properties. In certain embodiments, therefore, zinc oxide has a weight by percentage of 0.01%-7% of the glass composition.

The reinforcing material in certain embodiments is to improve the structural strength of the glass composition, and includes aluminum oxide, which is another skeleton oxide of which glass is made. When existing in glass in a proper amount, aluminum oxide can inhibit devitrification of silicon dioxide, prevent phase separation in borosilicate glass, and increase the chemical durability, the modulus of elasticity, and the hardness of glass. Aluminum oxide is also an ingredient capable of enhancing the ion exchange process in glassmaking. However, a relatively lower aluminum oxide content not only may lower the water resistance, and increase the dielectric constant, of the glass composition, hut also may result in a higher thermal expansion coefficient, lower resistance to thermal shock, and insufficient ion exchange. When the aluminum oxide content exceeds 18%, devitrifying crystallization tends to occur in glass such that a high bushing temperature is required to make glass fiber, if the glass fiber can be formed at all. In certain embodiments, therefore, aluminum oxide has a weight by percentage of 10%-20%, preferably 13%-17%, of the glass composition.

As can be known from the above, a high silicon dioxide content alone is capable of lowering the thermal expansion coefficient of the glass composition but will raise the viscosity temperature, cause difficulties in manufacture, and hinder the removal of bubbles. Accordingly, in certain embodiments, the glass composition further includes zinc oxide and titanium dioxide to lower the viscosity temperature while further reducing the thermal expansion coefficient, so as to maintain the intrinsic properties of glass, enhance glass performance, and contribute to the yield of glass fiber. The glass composition according to the present disclosure, however, is not limited to the foregoing ingredients and may include other ingredients as well. Based on further study on, experiment with, and adjustment for additional ingredients of the glass composition, the present disclosure finds that such additional ingredients enable the thermal expansion coefficient of the glass composition to be lowered on the one hand, and the desired dielectric constant and dissipation factor be achieved on the other hand, so as to meet the production requirements of different electronic devices. Certain exemplary additional ingredients are briefly described as follows.

In certain embodiments, the glass composition further includes calcium oxide (CaO), which serves to adjust the glass network, lower the temperature to be reached in order to melt the glass composition to make glass fiber, without compromising the devitrification resistance of the glass composition. In addition, calcium oxide contributes more to increasing the modulus of elasticity than other ingredients. However, a relatively higher calcium oxide content (e.g., higher than 6%) increases the dielectric constant and thermal expansion coefficient of the glass composition or hinder ion exchange. In certain embodiments, therefore, calcium oxide constitutes not more than 5% by weight of the glass composition (a preferred weight percentage being 0.1%-0.5%) in order to increase the water resistance of the glass composition. The glass composition may also include boron trioxide ($B_2O_3$), which serves to lower the thermal expansion coefficient and the temperature to be reached when the aforesaid raw materials are melted to make glass, and can stabilize glass to prevent crystallization therein. An overly high boron trioxide content, however, lowers the modulus of elasticity and water resistance. In certain embodiments, therefore, boron trioxide constitutes not more than 15% by weight of the glass composition in order to lower the viscosity temperature while maintaining the intrinsic properties of glass.

An alkali metal oxide may be added to the glass composition as a flux and to lower the dielectric loss of the glass composition and of the glass fiber made thereof. The alkali metal oxide may include sodium oxide ($Na_2O$), potassium oxide ($K_2O$) and/or lithium oxide ($Li_2O$). Sodium oxide is a major ingredient in the ion exchange process in glassmaking, can lower the viscosity temperature to facilitate melting and the formation of glass fiber, and can enhance devitrification resistance. Using an excessive amount of sodium oxide, however, will increase the thermal expansion coefficient. Potassium oxide is also an ingredient that promotes ion exchange in glassmaking, is an alkali metal oxide that works relatively well in increasing the stress depth of the compressive stress layer, and can lower the viscosity temperature as well to facilitate melting and the formation of glass fiber. Using an excessive amount of potassium oxide, however, also results in a high thermal expansion coefficient. Lithium oxide has the same effects as the foregoing alkali metal oxides, contributes positively to increasing the modulus of elasticity, and can facilitate the melting and purification of glass. As too high an alkali metal oxide content leads to a high dielectric loss tangent and poor water resistance (especially when the coexistence of sodium oxide and potassium oxide produces the mixed alkali effect, which causes a significant increase in the resistivity, and hence affects the thermal expansion coefficient, of glass), an ideal percentage of the aforesaid alkali metal oxides is not more than 2% by weight of the glass composition. The glass composition may include an impurity substance, which includes ferric oxide ($Fe_2O_3$). As an excessive amount of the impurity substance is disadvantageous to lowering the dielectric constant and dissipation factor of the glass composition, and too small an amount of the impurity substance leads to a relatively high material cost, the total weight of ferric oxide and/or other impurity substance(s), if present, preferably constitutes 0.05%-0.2% of the weight of the glass composition, for balancing between production cost and product quality.

To further display the performance difference between that achieved by the techniques according to the present disclosure and that by the conventional techniques, experiments have been conducted on several batches of conventional materials (namely the S-glass batch A1, the S-glass batch A2, the batch A3, and the batch A4) and several batches of the glass composition according to the present disclosure (namely the batches A5 to A8, the proportions of whose ingredients were different). Bach batch was poured into a ceramic crucible, subjected to a predetermined temperature (1500° C.-1550° C.) for a predetermined amount of time until completely melted, and then cooled down slowly to room temperature to form a block of glass. Each block of glass was cut with a diamond blade into thin glass plate samples that were 20 mm long and wide and 2-3 mm thick. The dielectric constant and dissipation factor of each glass plate sample were measured with a radio-frequency (RF) impedance analyzer, and the thermal expansion coefficient thereof was measured with a thermal mechanical analyzer according to ASTM E831. The test results are tabulated in FIGS. 1A and 1B. The conventional S-glass batch A1. S-glass batch A2, batch A3, and batch A4 served as comparative examples. None of the comparative examples contained zinc oxide. Some of the comparative examples did not contain titanium dioxide. The batches A5 to A8 represent certain embodiments according to the present disclosure, all containing zinc oxide and titanium dioxide. It can be seen in FIGS. 1A and 1B that the thermal expansion coefficients of ail the glass composition according to the present disclosure therein were lower than 2.5 ppm/° C. and far lower than those of the glass samples in the comparative examples (also far lower than those produced by the S-glass formulae currently used in the high-end PCB industry). The glass composition according to the present disclosure produced satisfactory results in the other test items (e.g., viscosity temperature, dielectric constants, and dissipation factors), and therefore can enhance the yield and electrical properties of glass fiber.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the an to which the present disclosure pertains without departing from its spirit and scope.

What is claimed is:

1. A glass composition, consisting of:

a main material, comprising silicon dioxide having a percentage by weight of 59%-63% of the glass composition;

a reinforcing material for improving structural strength of the glass composition, comprising aluminum oxide having a percentage by weight of 15%-16.5% of the glass composition;

a fluxing material for lowering a thermal expansion coefficient and a viscosity temperature of the glass composition, comprising magnesium oxide, zinc oxide, and titanium dioxide, wherein a percentage by weight of magnesium oxide is 6%-8.5% of the glass composition, a percentage by weight of zinc oxide is 2.5%-3.5% of the glass composition, and a percentage by weight of titanium dioxide is 1.5%-3.5% of the glass composition;

boron trioxide having a percentage by weight of 7.8%-10% of the glass composition; and at least one alkali metal oxide that includes at least one of sodium oxide and potassium oxide for lowering dielectric loss of the glass composition, wherein a sum of every single one of the at least one alkali metal oxide has a percentage by weight of, or below, 0.33% of the glass composition, wherein a percentage by weight of lithium oxide in the glass composition is 0; the percentage by weight of silicon dioxide, the percentage by weight of aluminum oxide, the percentage by weight of magnesium oxide, the percentage by weight of zinc oxide, the percentage by weight of titanium dioxide, the percentage by weight of boron trioxide, a percentage by weight of calcium oxide, the percentage by weight of at least one alkali metal oxide, and a percentage by weight of ferric oxide together constitute 100% of the glass composition; and the thermal expansion coefficient of the glass composition is equal to or higher than 2.37 ppm/° C., and lower than 2.5 ppm/° C.

2. The glass composition according to claim 1, further comprising calcium oxide for increasing water resistance of the glass composition, having the percentage by weight of, or below, 5% of the glass composition.

3. The glass composition according to claim 1, further comprising an impurity substance comprising ferric oxide.

4. The glass composition according to claim 3, wherein the percentage by weight of ferric oxide is 0.05%-0.2% of the glass composition.

5. The glass composition according to claim 2, wherein the percentage by weight of calcium oxide is 0.1%-0.5% of the glass composition.

6. A glass fiber made of the glass composition according to claim 1.

7. The glass fiber according to claim 6, wherein the glass composition further comprises calcium oxide for increasing water resistance of the glass composition, wherein the calcium oxide has the percentage by weight of, or below, 5% of the glass composition.

8. The glass fiber according to claim 6, wherein the glass composition further comprises an impurity substance comprising ferric oxide.

9. The glass fiber according to claim 8, wherein the percentage by weight of ferric oxide is 0.05%-0.2% of the glass composition.

10. The glass fiber according to claim 7, wherein the percentage by weight of calcium oxide is 0.1%-0.5% of the glass composition.

11. A glass composition, comprising:

a main material, comprising silicon dioxide having a percentage by weight of 59%-63% of the glass composition;

a reinforcing material for improving structural strength of the glass composition, comprising aluminum oxide having a percentage by weight of 15%-16.5% of the glass composition;

a fluxing material for lowering a thermal expansion coefficient and a viscosity temperature of the glass composition, comprising magnesium oxide, zinc oxide, and titanium dioxide, wherein a percentage by weight of magnesium oxide is 6%-8.5% of the glass composition, a percentage by weight of zinc oxide is 2.5%-3.5% of the glass composition, and a percentage by weight of titanium dioxide is 1.5%-3.5% of the glass composition;

boron trioxide having a percentage by weight of 7.8%-10% of the glass composition; and at least one alkali metal oxide that includes at least one of sodium oxide and potassium oxide for lowering dielectric loss of the glass composition, wherein a sum of every single one of the at least one alkali metal oxide has a percentage by weight of, or below, 0.33% of the glass composition, wherein a percentage by weight of lithium oxide in the glass composition is 0, and the thermal expansion coefficient of the glass composition is equal to or higher than 2.37 ppm/° C., and lower than 2.5 ppm/° C.

12. The glass composition according to claim 11, further comprising calcium oxide for increasing water resistance of the glass composition, having a percentage by weight of, or below, 5% of the glass composition.

13. The glass composition according to claim 11, further comprising an impurity substance comprising ferric oxide.

14. The glass composition according to claim 13, wherein a percentage by weight of ferric oxide is 0.05%-0.2% of the glass composition.

15. The glass composition according to claim 12, wherein the percentage by weight of calcium oxide is 0.1%-0.5% of the glass composition.

16. A glass fiber made of the glass composition according to claim 11.

17. The glass fiber according to claim 16, wherein the glass composition further comprises calcium oxide for increasing water resistance of the glass composition, wherein the calcium oxide has a percentage by weight of, or below, 5% of the glass composition.

18. The glass fiber according to claim 16, wherein the glass composition further comprises an impurity substance comprising ferric oxide.

19. The glass fiber according to claim 18, wherein a percentage by weight of ferric oxide is 0.05%-0.2% of the glass composition.

20. The glass fiber according to claim 17, wherein the percentage by weight of calcium oxide is 0.1%-0.5% of the glass composition.

* * * * *